Patented Mar. 8, 1938

2,110,374

UNITED STATES PATENT OFFICE 2,110,374

RUBBER DERIVATIVE COMPOSITIONS

Herbert A. Winkelmann and Eugene W. Moffett, Chicago, Ill., assignors to Marbon Corporation, a corporation of Delaware No Drawing. Application May 28, 1936, Serial No. 82,253

21 Claims. (Cl. 134—17)

This invention relates to compositions of halogen containing rubber derivatives and rubber. It is concerned particularly with uniform, stable dispersions of rubber hydrochloride and rubber.

It has been found that uniform dispersions of rubber and rubber hydrochloride are different from partially saturated rubber hydrochloride of the same chlorine content. In general, partially saturated rubber hydrochlorides are more tacky than the dispersion of rubber and rubber hydrochloride, and there are other important differences. However, in many ways the compositions are similar, as for example the important property of flexibility.

Partially saturated rubber hydrochlorides have long been known and used. Uniform dispersions of rubber and rubber hydrochloride which are stable over an extended period of time have not been made, as far as is known, in spite of the apparent simplicity of their production and the many uses for such a composition. However, such compositions are not readily attained because rubber and rubber hydrochloride tend to separate from each other.

We have found that uniform stable dispersions may be made by fluxing rubber hydrochloride on a mill and adding the rubber slowly to the fluxed rubber hydrochloride. For the production of uniform dispersion of saturated rubber hydrochloride and rubber the rubber hydrochloride is fluxed with a stabilizer such as magnesium oxide, sodium stearate or the like. The rubber is then slowly added to the fluxed mixture and the milling continued until a homogeneous dispersion is obtained. Solvents may then be added if desired.

Our invention is applicable to the production of compositions of various proportions of rubber and rubber hydrochloride together with other ingredients. Depending on the type and proportion of the ingredients there may be produced compositions adapted for lacquers, adhesives, or molded products.

The following example will illustrate the invention as applied to plastic compositions:

Example I

A mixture of:—

| | Parts |
|---|---|
| Rubber hydrochloride (crystalline) | 100 |
| Magnesium oxide | 10 |
| Rosin | 10 | was compounded by fluxing on a mill until a homogeneous mass was obtained, and to the fluxed mass was added 100 parts of scrap inner tubes followed by 100 parts of titanium dioxide. The homogeneous dispersion was then calendered into a thin flexible sheet adapted for use as a washable curtain or shade, a table cloth, oil cloth substitute and the like. The sheet also is useful for laminating purposes. Instead of calendering into a sheet the homogeneous mixture may be subjected to heat and pressure and molded or extruded into useful articles of manufacture characterized by their high strength and resistance to ordinary solvents such as alcohol and gasoline, and further characterized by a resilience and elasticity not ordinarily found in gasoline resistant plastic compositions. Other fillers than titanium dioxide (rayox) may be used as, for example, carbon black, blanc fixe, whiting, wood flour, asbestos, cotton flock and the like. For some purposes additional filler than that present in the scrap rubber need not be used. Other basic stabilizers such as calcium oxide or hydroxide, litharge, barium hydroxide, disodium phosphate may wholly or partially replace the magnesium oxide. Other homogenizing agents than rosin may be used as, for example, opal wax, esters of abietic acids and other materials which are solid at room temperature but fluid at the temperature of milling. Plasticizers such as coumarone resin, alkyd resins, opal wax hydrogenated ethyl abietate, butyl stearate may be incorporated with the mixture to obtain increased flexibility. In place of scrap inner tube, any scrap or crude vulcanized rubber may be used.

Example II

A mixture of:—

| | Parts |
|---|---|
| Rubber hydrochloride (amorphous) | 100 |
| Hexamethylene tetramine | 2 |
| Magnesium oxide | 2 | was compounded by fluxing on differential rolls, and to 33 parts of this material was added—

| | Parts |
|---|---|
| Alkali tube reclaim | 100 |
| Rosin | 83 |
| Antioxidant | 1 | until a soft, smooth, tacky dough was formed. For some purposes this dough may be used as an adhesive, but it is preferable to dissolve it in quick drying solvent. The dough is, for example, placed in a mixer and gasoline, toluol or the like added until a cement of the desired consistency is obtained. This cement is particularly useful for bonding rubber to metal. It has the property of drying to an adhesive like material which retains its tackiness over an extended period of time. This property of retaining its tackiness has been found to be mainly a function of the resin content and of the type of reclaim. Resins of a gumming nature such as rosin, ester gum, copal, paracoumarone, and the like will impart good bonding strength and tackiness when used within approximately the proportion of one part resin to two parts of reclaim, or two parts resin to one part of reclaim. The reclaim should preferably be a type of reclaim which has been highly thermoplasticized in the presence of alkali.

Although adhesives made essentially from alkali reclaim and resins (resin gums) are of value, we have found that the addition of a halogen containing rubber derivative such as rubber hydrochloride to the mixture imparts increased "tooth" and strength. Such adhesive compositions are particularly adapted for bonding rubber to metal. The proportion of rubber hydrochloride to reclaim may vary widely, but preferably should be between about 10 to 50 parts per 100 parts of reclaim by weight for permanently tacky cements.

Example III

A cement which is not permanently tacky but which has high strength of bond was made by milling together the following and adding a quick drying organic solvent:

| | |
|---|---|
| Rubber hydrochloride (amorphous) | 30 |
| Alkali reclaim | 100 |
| Rosin | 400 |
| Magnesium oxide | 10 |
| Anti-oxidant | 3 |

This type of cement is characterized by having the ability to give a strong bond of rubber to metal. The rubber hydrochloride functions to increase the softness and thermoplasticity of the cement so that unlike many hard drying cements, this cement will not break from the interface of the metal and rubber on expansion or contraction of the metal. The proportion of rubber hydrochloride to reclaim may vary widely between 10 to 200 parts per 100 parts of reclaim by weight.

Example IV

The following formula is suitable for a permanently tacky adhesive for masking tape:

| | Parts by weight |
|---|---|
| Rubber (milled) | 100 |
| Rubber hydrochloride (saturated amorphous) | 10 |
| Rosin | 0–60 |
| Solvent | As needed |

Example V

The following example illustrates a general adhesive for paper, leather, fabric and the like. The adhesive is not tacky.

| | Parts by weight |
|---|---|
| Rubber (milled) | 100 |
| Rubber hydrochloride (saturated amorphous) | 100–200 |
| Rosin | 5–100 |
| Solvent | As needed |

Example VI

The following example illustrates an adhesive which is not permanently tacky. It is suitable for tape which is to be used once.

| | |
|---|---|
| Rubber (milled) | 100 |
| Rubber hydrochloride (saturated) | 400–500 |
| Rosin | 50–100 |
| Solvent | As needed |

The rubber hydrochloride in all cases is preferably stabilized with a basic stabilizer such as magnesium oxide, magnesium carbonate, lime, sodium stearate or the like.

The above examples illustrate the various types of cements made from mixtures of rubber hydrochloride and rubber. The use of rubber hydrochloride with rubber gives a composition of increased tensile strength, and a product which has improved ability to hold rubber to metal during temperature changes.

Example VII

The mixtures of rubber and rubber hydrochloride are not only useful for adhesives but the non-tacky compositions are suitable for molded articles. The following example illustrates a composition particularly suitable for molding into golf ball covers:

| | Preferred weight | Range weight |
|---|---|---|
| Saturated amorphous rubber hydrochloride | 100 | 100 |
| Saturated crystalline rubber hydrochloride | 15 | 0–100 |
| Pale crepe (400 plasticity) | 85 | 20–150 |
| Rayox ($TiO_2$) | 10 | 0–20 |
| Magnesium oxide | 15 | 0–30 |
| Hexamethylene tetramine | 3 | 0–5 |

In compounding the above formulae the rubber hydrochloride is first added to the mixing rolls and the magnesium oxide and hexamethylene tetramine added to rubber hydrochloride during the milling and fluxing. The mixture is refined (sheeted thin) and the refined mass is then added to the mill and fluxed. The rubber is then slowly added and dispersed into the rubber hydrochloride. Then the pigment is added and milled in until a uniform dispersion is obtained. The product is molded around golf balls at about 240° C. according to the usual procedure in making golf ball covers.

Numerous variations and modifications in the procedure hereinabove set forth may be made without departing from our invention, it being particularly understood that incorporation with the plastic of other materials, such as other heat stabilizers than magnesium oxide as lead oxide, sodium carbonate, disodium phosphate; plasticizers such as dibutyl phthalate, hydrogenated ethyl abietate; fillers such as titanium dioxide, blanc fixe; vulcanizing agents such as sulfur, and other materials which may be compatible with the mixture either during or after preparation of the plastic are contemplated and comprehended within the scope of this invention.

Vulcanized rubber and reclaim are included in the term rubber. Saturated and partially saturated, amorphous and crystalline products are included in the term rubber hydrochloride. The amorphous rubber hydrochloride is the so-called product obtained by reacting undissolved rubber with liquefied hydrogen chloride at −85° C.

We claim:

1. An adhesive composition comprising a rubber hydrochloride and a reclaimed vulcanized rubber intimately admixed to form a dough, said dough being dispersed in an organic solvent.

2. An adhesive cement comprising an intimate flowable dispersion of a rubber hydrochloride, a reclaimed vulcanized rubber, and a resin gum in a volatile organic solvent.

3. An adhesive cement comprising an intimate flowable dispersion of an amorphous rubber hydrochloride, an alkali reclaimed vulcanized rubber, and rosin in a volatile organic solvent.

4. An adhesive cement comprising an intimate doughy dispersion of an amorphous rubber hydrochloride, rubber and a resin in a volatile organic solvent, said rubber hydrochloride being present in lesser proportion than the rubber.

5. An adhesive cement comprising an intimate dispersion of a rubber hydrochloride, rubber and a resin in a volatile organic solvent, said rubber hydrochloride being present in lesser proportion than the rubber.

6. An adhesive cement comprising an intimate dispersion of a stabilized rubber hydrochloride, rubber and a resin in a volatile organic solvent, said rubber hydrochloride being present in lesser proportion than the rubber.

7. An adhesive cement comprising an intimate dispersion of a rubber hydrochloride, thermoplasticized vulcanized rubber (reclaim) and a resin gum in a volatile solvent, said rubber hydrochloride being present in lesser proportion than the rubber.

8. An adhesive cement comprising an intimate dispersion of a rubber hydrochloride, rubber and a resin selected from the group consisting of rosin, ester gum, copal, and polycoumarone in a volatile solvent, said rubber hydrochloride being present in lesser proportion than the rubber.

9. An adhesive cement comprising an intimate dispersion of a rubber hydrochloride, rubber and rosin in a volatile solvent, said rubber hydrochloride being present in lesser proportion than the rubber.

10. An adhesive composition comprising an intimate dispersion of a stabilized rubber hydrochloride, a resin gum, and vulcanized rubber which has been thermoplasticized in the presence of alkali (alkali reclaim), the proportion of resin to reclaim being within approximately the range of from one part of resin to two parts of reclaim and from two parts of resin to one of reclaim, and the proportion of rubber hydrochloride to reclaim being in approximately the proportion of ten to fifty parts of rubber hydrochloride to 100 parts of reclaim.

11. An adhesive composition comprising a rubber hydrochloride, and thermoplasticized vulcanized rubber (reclaim).

12. An adhesive composition comprising a rubber hydrochloride, thermoplasticized vulcanized rubber (reclaim), and a resin selected from the group consisting of rosin, ester gum, copal and polycoumarone.

13. An adhesive composition comprising a stabilized rubber hydrochloride, thermoplasticized vulcanized rubber (reclaim) and rosin.

14. An adhesive composition comprising a stabilized rubber hydrochloride, thermoplasticized vulcanized rubber (reclaim) and ester gum.

15. An adhesive cement comprising an intimate dispersion of an amorphous rubber hydrochloride, vulcanized rubber which has been thermoplasticized in the presence of an alkali (alkali reclaim), rosin and a basic alkali earth compound in a volatile organic solvent.

16. An adhesive cement comprising an intimate dispersion of a rubber hydrochloride, rubber, and a resin selected from the group consisting of rosin, ester gum, copal, and polycoumarone in a volatile solvent.

17. An adhesive cement comprising an intimate dispersion of a rubber hydrochloride, rubber, a resin gum and a substance selected from the group consisting of basic alkali metal compounds, basic alkali earth metal compounds, and basic lead compounds in a volatile solvent.

18. An adhesive composition comprising a rubber hydrochloride, a thermoplasticized vulcanized rubber and a resin.

19. An adhesive cement comprising an intimate dispersion of a rubber hydrochloride and a thermoplasticized vulcanized rubber in a volatile solvent.

20. An adhesive cement comprising an intimate dispersion of a rubber hydrochloride, a thermoplasticized vulcanized rubber, and a resin in a volatile solvent.

21. An adhesive composition comprising a rubber hydrochloride, a thermoplasticized vulcanized rubber, and a basic stabilizer for said rubber hydrochloride.

HERBERT A. WINKELMANN.
EUGENE W. MOFFETT.